United States Patent [19]
Meyers

[11] 3,783,546
[45] Jan. 8, 1974

[54] FISHING LURE RETRIEVER

[76] Inventor: Duane A. Meyers, 7125 Main St., Trumbull, Conn. 06611

[22] Filed: Mar. 15, 1972

[21] Appl. No.: 234,706

[52] U.S. Cl. .............................. 43/17.2, 43/44.95
[51] Int. Cl. ............................................ A01k 97/00
[58] Field of Search .................... 43/17.2, 5, 44.9, 43/44.92, 44.93, 44.95

[56] References Cited
UNITED STATES PATENTS

| | | | |
|---|---|---|---|
| 2,493,100 | 1/1950 | Adams, Jr. | 43/17.2 |
| 2,760,810 | 8/1956 | Smith | 43/17.2 UX |
| 3,375,602 | 4/1968 | Clark et al. | 43/17.2 |
| 2,714,777 | 8/1955 | Peak | 43/17.2 |
| 3,352,049 | 11/1967 | Agostini | 43/17.2 |
| 3,628,279 | 12/1971 | Halone | 43/17.2 |

FOREIGN PATENTS OR APPLICATIONS

| | | | |
|---|---|---|---|
| 787,621 | 6/1968 | Canada | 43/17.2 |

Primary Examiner—Louis G. Mancene
Assistant Examiner—James H. Czerwonky
Attorney—H. Gibner Lehmann and K. Gibner

[57] ABSTRACT

A fishing lure retriever for recovering lures which have become entangled in submerged debris. The retriever comprises a latching member adapted to be applied to a fishing line, and to slide along the line to the lure so as to latch onto the latter. The body of the member has a substantially greater density than that of water, thereby enabling it to readily submerge. The body is provided with a longitudinal slot into which the fishing line can be easily and quickly inserted without requiring that it be broken or cut; thereafter the retriever body is allowed to gravitationally slide downward along the line to the location of the lure. The retriever body is also connected with a recovery line which is fastened to one of its ends. A pair of spring-loaded retractable grippers are disposed at the other end of the body, and have camming surfaces which can engage the usual hollow ball carrying swivel eyes by which the lure is fastened to the line. With the retriever body securely seizing the swivel ball, the lure can now be recovered by merely forcibly pulling on the recovery line.

10 Claims, 10 Drawing Figures

PATENTED JAN 8 1974 3,783,546
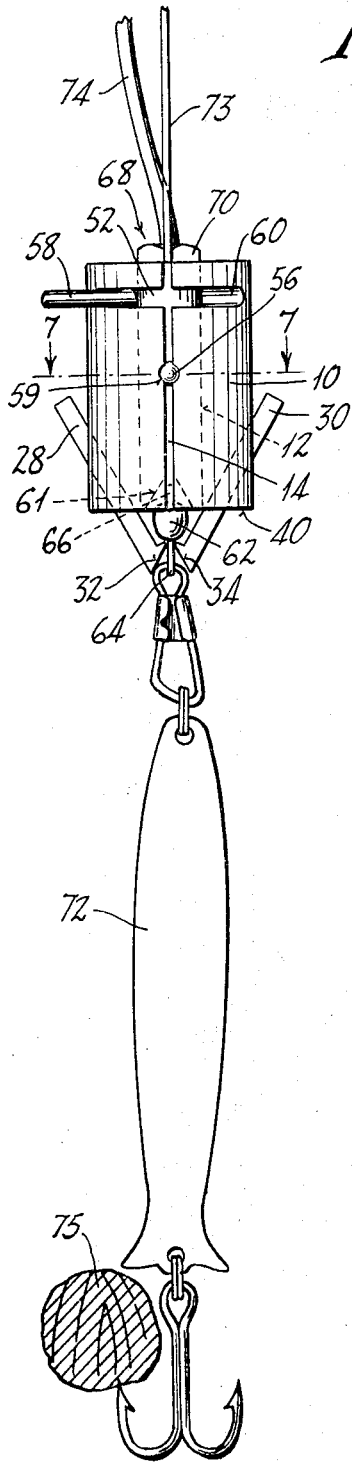
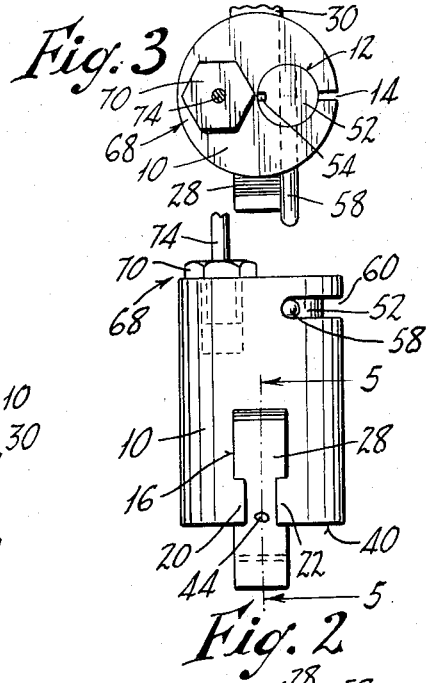
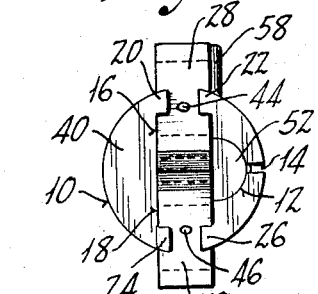
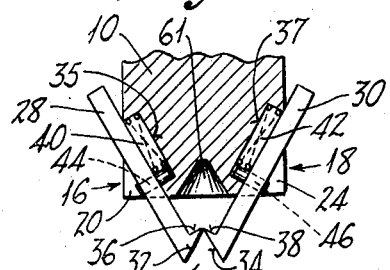
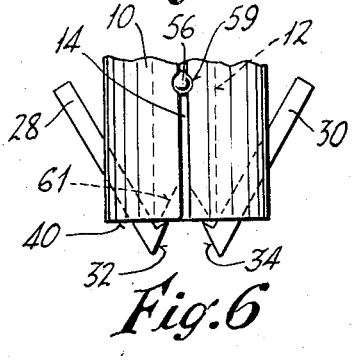
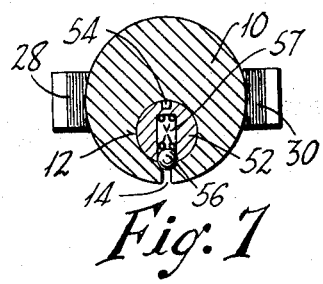
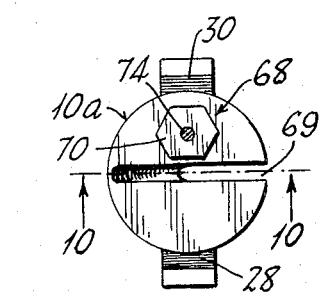
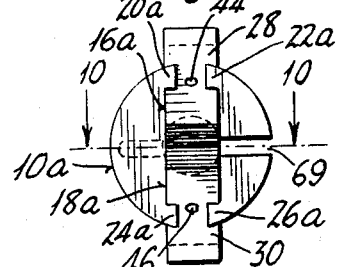
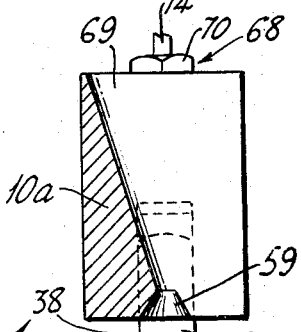

FISHING LURE RETRIEVER

BACKGROUND

This invention relates to fishing lure retriever devices, and more particularly to devices of the type employing a body which is applied to a fishing line and allowed to slide downward along the line, eventually arriving at the location of the entangled lure. In the past a number of devices of this type have been employed to recover fishing lures which had become entangled in submerged debris. Usually these prior devices required the cutting of the fishing line in order to insert the end of the line into a hole in the retriever body. Thus the cut line needed splicing after the lure was recovered, or more frequently the entire length of the line had to be replaced.

The means by which the previous devices gripped the snagged lure were also somewhat clumsy and inefficient, and the likelihood of successful recovery often depended to a large extent upon the relative size and shape of the lure, and upon the particular orientation of the lure after it had become entangled. In addition, protruding debris, such as tree limbs or branches adjacent to the location of the entangled lure sometimes seriously interferred with the operation of the retriever. In cases where a number of moving parts were involved, smooth operation of the parts was sometimes jeopardized as a result of dirt particles becoming lodged in the movable mechanism. Frequently the lure was not recoverable with use of these previous devices, and occassionally the retriever body itself would become entangled and subsequently lost.

SUMMARY

The above drawbacks and disadvantages of the prior lure retriever devices are obviated by the present invention which has for one object the provision of an improved and novel fishing lure retriever device which does not require the cutting of the fishing line for its employment, and which can be used to recover virtually any type of fishing lure, regardless of its size or shape. A related object of the invention is the provision of an improved lure retriever which is sturdy in construction, non-susceptible to fouling due to dirt or debris becoming lodged within the mechanism, and which is not readily lost due to entanglement of the retriever body itself. These objects are accomplished by the provision of a main member or body having substantial weight or density so as to enable it to readily submerge. The body has, disposed at one end, a pair of oblique guide slots which carry retractable grippers or slides. The slides comprise camming end surfaces which are adapted to engage the hollow ball by which the lure and fishing line are normally joined to permit swiveling or spinning. In addition, the retriever body is provided with a longitudinal clearance slot in one side wall, extending from end to end and adapted to receive the fishing line. In one embodiment, a cylindrical, grooved line positioner is located in the slot and adapted to receive the line in its groove and subsequently to be rotated within the body in such a manner as to align the fishing line with the axis of the body, thereby holding the retriever body captive on the line. In a second embodiment, the line clearance slot has a graduated depth, thereby enabling the retriever to be "hung" onto the line with a low center of gravity, and to be slidably movable with respect thereto. A fastening means is provided at the other end of the body, to which a high tensile strength retriever line is secured, thereby enabling the retriever to be recovered after seizure of the lure has been effected.

Still other features and advantages will hereinafter appear.

In the drawings which are illustrative of several embodiments of the invention:

FIG. 1 is a front elevational view of one embodiment of the invention, showing the retriever device with its gripper slides latched onto the swivel ball of a fishing lure.

FIG. 2 is a side elevational view of the body of the retriever of FIG. 1.

FIG. 3 is a top plan view of the retriever body of FIGS. 1 and 2.

FIG. 4 is a bottom plan view of the retriever body.

FIG. 5 is a fragmentary vertical sectional view taken on the line 5—5 of FIG. 2.

FIG. 6 is a fragmentary front elevational view illustrating the retracted positions of the gripper slides.

FIG. 7 is a horizontal sectional view taken on the line 7—7 of FIG. 1.

FIG. 8 is a top plan view of a retriever constituting a second embodiment of the invention.

FIG. 9 is a bottom plan view of the retriever body of FIG. 8.

FIG. 10 is a vertical section taken on the line 11—11 of FIG. 9.

FIGS. 1–7 illustrate one embodiment of the invention. The fishing lure retriever of this embodiment comprises a cylindrical body 10 having substantial weight, that is, having a greater density than water so as to enable it to readily submerge. In accordance with the present invention the body 10 is provided with an eccentrically-disposed, cylindrical longitudinal bore 12 running its entire length, and further has a longitudinal, fishing lure clearance slot or passage 14 in its outer wall, which communicates with the bore 12.

There are disposed at one end of the body 10 two oblique guide slots 16 and 18, which have retainer shoulders 20, 22 and 24, 26 respectively. The guide slots 16, 18 are adapted to receive retractable gripper slides 28 and 30, which are provided with camming surfaces 32 and 34 respectively, and with undercut surfaces 36 and 38 respectively at their adjacent or corresponding extremities. There are further provided, in the bottom walls of each of the guide slots 16, 18 additional carrier slots 35 and 37 which accommodate helical compression coil springs 40 and 42 respectively.

The gripper slides 28 and 30 are biased to normally advanced positions as illustrated in FIG. 5 by the springs 40 and 42, which cooperate with limit or stop pins 44 and 46 force-fitted into holes in the slides during assembly of the latter into the retriever body 10. The pins 44 and 46 also serve to permanently retain the slides and to limit the sliding motion thereof with respect to the body, to that permitted by engagement with the extremities of the slots 35 and 37. The determining of the retracted positions of the slides 28 and 30 is effected by engagement of the undercut surfaces 36 and 38 thereof with the bottom end surface 40 of the body 10, as illustrated in FIG. 6.

In addition to the above structure, there is further provided by the invention a longitudinally extending cylindrical line centralizer or member 52 disposed in the eccentric bore 12 and having substantially the same length as the body 10. The member 52 is of a diameter to snugly turn in the bore 12, and has a longitudinal groove 54 running for its entire length. The member 52 also contains a spring-charged detent as illustrated in FIG. 7, comprising a compression spring 55 and a ball 56. A manually operable finger piece 58 is provided, carried by the member 52 and extending through a transverse guide slot 60 in the body 10, to enable turning of the member 52 to be effected with respect to the body 10. A lateral bore 59 of slightly smaller diameter than that of the ball 56 is provided in the body 10, adapted to receive a portion of the ball when the member 52 has the position shown in FIG. 7.

The bottom end 40 of the body 10, FIG. 6, and an adjoining portion of the member 52 provided have cutaway portions arranged in such a way that they form an essentially conical recess 61 when the member 52 is turned to one extreme position as shown in FIGS. 1 and 7. For this position the groove 54 in the member 52 is located nearest the axis of the body 10.

The recess 61 is thus adapted to easily accept a hollow ball 62 and one of the swivel eyes 64, 66 as shown in FIG. 1.

Referring to FIGS. 1–3 there is provided a fastening means 68 comprising a screw 70 having a central bore. A threaded hole in the body 10 receives the screw, and a retriever line 74 passes through the bore in the screw and is secured thereto by a knot (not shown).

From the above description, the operation of the fishing lure retriever can now be readily understood. In FIG. 1 there is shown a lure 72 secured to a line 73 by means of the hollow ball 62 and swivel eyes 64 and 66. Assuming the lure has become entangled in submerged debris such as the branch 75, the retriever can be employed to recover the lure with a minimum of effort and without cutting the line. In accomplishing this, the manually operable fingerpiece 58 is swung to engage one end limit of the transverse guide slot 60, to cause the groove 54 in the member 52 to become aligned with the line clearance slot 14. The line 73 can now be passed laterally through the clearance slot 14 and placed into the groove 54 with the body 10 of the retriever positioned so that the bottom end adjacent the grippers faces in the direction of the snagged lure. With the line 73 positioned in the groove 54, the fingerpiece 58 is swung to its opposite extreme, thereby shifting the groove 54 and captive line 73 to a centralized position coincident with the axis of the body 10. With the line 73 held taut, the body 10 is now allowed to slide downward along it under the action of gravity, toward the snagged lure. When the retriever body arrives at the lure, the camming surfaces 32 and 34 of the retractable gripper slides 28 and 30 engage the hollow ball 62. The substantial weight of the body 10 acting against the ball 62 causes the latter to effect a partial retraction of the slides 28 and 30, to the extent that the ball 62 can pass through the opening created by the retraction and be received in the clearance recess 61. After the ball 62 has sufficiently cleared the opening between the camming surfaces 32 and 34, the slides 28 and 30 return to their normal advanced positions as indicated in FIG. 1. The lure and retriever body can now be recovered by gently pulling on the line 74 which is of substantially greater tensile strength than the fishing line 73. The hollow ball 62 and attached lure 72 are thus positively seized by the undercut surfaces 36 and 38 of the slides 28 and 30, and the lure can in most cases be safely recovered without likelihood of loss, or breakage of the fishing line 73.

Another embodiment of the invention is shown in FIGS. 8–10. This modified form of retriever includes a cylindrical body 10a having a substantially greater density than that of water, thereby enabling it to be readily submerged. At one end of the body 10a there are disposed two oblique guide slots 16a and 18a which hold a pair of retractable gripper slides 28 and 30, and are identical in construction and operation to those of the previous embodiment particularly illustrated in FIGS. 4, 5 and 6. The guide slots 16a and 18a have shoulder portions 20a, 22a and 24a, 26a respectively, which form captive channels in which the slides may shift longitudinally. A pair of carrier slots (not shown) house helical compression springs (not shown) identical to those illustrated in FIG. 5 and designated 35, 37 and 40, 42 respectively. The springs provide bias for the gripper slides 28 and 30, thereby maintaining said slides in their normally advanced positions as illustrated in FIG. 5. During the assembly of the retriever, the limit pins 44 and 46 are force-fitted into holes in the slides 28 and 30, thereby limiting the relative sliding motion between each slide and the body 10a.

In accordance with the present invention there is provided in one wall of the body 10a a longitudinal slot or passage 69 having a graduated depth. At the end of the body 10a adjacent the gripper slides there is further provided a clearance recess 59 of substantially conical shape, adapted to receive the hollow ball 62 and one of the swivel eyes 64 and 66 by which the lure is fastened to the fishing line. The depth of the slot 69 at the end adjacent the slides is roughly equivalent to a radius of the body. The depth of the slot at the opposite end is slightly less than the diameter of the body 10a. The width of the slot is sufficient to accept the fishing line 73. At this opposite end of the body 10a there is also included a fastening means 68, comprising a hollow screw 70 which fits into a threaded hole in the body. The retriever line 74 is secured by the screw 70, as will be understood.

The operation of this embodiment of the invention can now be readily understood. Assuming that a lure has become entangled while submerged, the taut fishing line 73 is inserted into the longitudinal slot 69 in the side wall of the body 10a, the body being oriented so that the retractable gripper slides 28 and 30 face in the direction of the snagged lure. Due to the non-uniform depth of the slot 68 in the wall of the body, the center of gravity of the body will fall below the axis of the line when the retriever is "hung" on the line as above described. This tends to keep the body of the retriever from revolving about the axis of the line, and thereby falling off. In FIG. 10, the center of gravity of the retriever body lies to the right of the border between the sectioned and non-sectioned areas. Assuming that, from the position of FIG. 10, the body is rotated somewhat less than one quarter of a turn clockwise, about an axis perpendicular to the plane of the paper, and then is suspended from a taut fishing line inserted in the slot 69, it can be seen that this center of gravity will fall below the line. This enables the body "to hang" upon the fish line as it slides down the latter to the location of the snagged lure. The retriever body can now be lowered slowly so as to slide down the line to the location of the lure. In a manner identical to that of the first embodiment of the invention described above, the camming surfaces 32 and 34 of the retractable gripper slides 28 and 30 will respectively engage the hollow ball 62. The weight of the body 10a acting against the force of the ball 62 (which is fastened to the taut fishing line 73) causes the slides 28 and 30 to retract, thereby enabling the ball 62 to pass through the opening created by such retraction and become seated in the clearance recess 59 shown in FIG. 10. After the ball 62 has substantially cleared the opening, the slides return to their normally advanced positions under the action of springs (not shown) like those designated 36 and 38 in FIG. 5. The lure can now be recovered by gently pulling on the high strength retriever line 74. During such recovery, the ball 62 is positively seized by the undercut surfaces 36 and 38 of the slides 28 and 30 respectively.

It will now be understood from the foregoing that I have provided a novel and improved fishing lure retriever which is simple in construction, reliable in operation, and has a minimum number of moving parts. The gripper slides can be of substantially rectangular cross section, thereby enabling them to be cut from strip stock or from a single, large sheet. The body of the retriever can be fabricated as a single piece, thereby keeping assembling time of the device to a minimum. The helical compression springs are contained in recessed slots which are not externally exposed after assembly has been completed, and therefore are not subject to fouling due to dirt particles or debris which might otherwise interfere with their operation.

Variations and modifications are possible without departing from the spirit of the invention.

I claim:

1. A fishing lure retriever, comprising in combination:
   a. an elongate body of substantial weight,
   b. said elongate body having a plurality of elongate oblique guide slots at one end,
   c. retractable gripper slides mounted in the oblique guide slots and adapted to slide longitudinally therein, said slides having gripper ends constituted of sloping end surfaces and having biasing means urging them to advanced positions,
   d. a longitudinal line clearance passage extending between the ends of the body and adapted to receive the fishing line, one end of said clearance passage being disposed adjacent the gripper ends of said slides to dispose the fishing line between said ends when the line is carrying said body, and
   e. fastening means mounted at the other end of the body for attaching a retriever line thereto.

2. The invention as set forth in claim 1, wherein:
   a. said body is provided with a conical recess at one end thereof, adapted to receive an enlargement on the line.

3. The invention as set forth in claim 1, wherein:
   a. said sloping end surfaces of the gripper slides constitute camming means which effect a retracting of the slides when the latter are subjected to a force imposed by an enlargement on the fishing line.

4. The invention as set forth in claim 1, wherein:
   a. said fastening means comprises a screw having a central bore adapted to receive the retriever cable, and
   b. said screw being threaded into said other end of the body at an off-center location.

5. The invention as defined in claim 1, wherein:
   a. said guide slots open onto side peripheral surfaces of the body, and
   b. said retractable slides obliquely projecting from the peripheral side surfaces of the body.

6. The invention as defined in claim 1, wherein:
   a. said passage comprises a longitudinal slot in a side wall of the body,
   b. at said one end of the body, the depth of the slot is substantially equal to the body radius, and at said other end of the body the depth of the slot is commensurate with the cross dimension of the body whereby the center of gravity of the body can be disposed at one side of the fishing line which carries it.

7. A fishing lure retriever, comprising in combination:
   a. an elongate body of substantial weight,
   b. said elongate body having a plurality of oblique guide slots at one end,
   c. retractable gripper slides mounted in the oblique guide slots, said slides having gripper ends constituted of sloping end surfaces and undercuts adjoining the latter,
   d. a longitudinal line clearance passage extending between the ends of the body and adapted to receive the fishing line, one end of said clearance passage being disposed adjacent the gripper ends of said slides to dispose the fishing line between said ends when the line is carrying said body,
   e. fastening means mounted at the other end of the body portion for attaching a retriever line thereto,
   f. said body having clearance slots disposed in the walls of the guide slots, and
   g. helical compression springs mounted in said clearance slots,
   h. said gripper slides having limit pins which extend into the clearance slots and engage ends of said compression springs thereby to bias the slides to extended positions.

8. A fishing lure retriever, comprising in combination:
   a. an elongate body of substantial weight,
   b. said elongate body having a plurality of oblique guide slots at one end,
   c. retractable gripper slides mounted in the oblique guide slots, said slides having gripper ends constituted of sloping end surfaces and undercuts adjoining the latter,
   d. a longitudinal line clearance passage extending between the ends of the body and adapted to receive the fishing line, one end of said clearance passage being disposed adjacent the gripper ends of said slides to dispose the fishing line between said ends when the line is carrying said body,
   e. fastening means mounted at the other end of the body portion to attaching a retriever line thereto,
   f. said body having an eccentric longitudinal bore communicating with said passage and coextensive therewith,
   g. a turnable member disposed within the bore and having a groove extending the full length thereof, and
   h. a longitudinal cut in the side wall of the body adapted for alignment with the groove of the turnable member, to enable the fishing line to be inserted in said groove.

9. The invention as set forth in claim 8, and further including:
  a. manually operable means for turning said turnable member to bring the inserted fishline to the axis of the body.
10. The invention as defined in claim 9, wherein:
  a. said manually operable means comprises a pin extending laterally from said turnable member, and
  b. said body having a transverse slot in its side wall through which said pin extends.

* * * * *